April 6, 1954     W. F. TINSLEY     2,674,221
TILT OR INVERSION INDICATOR
Filed June 24, 1953
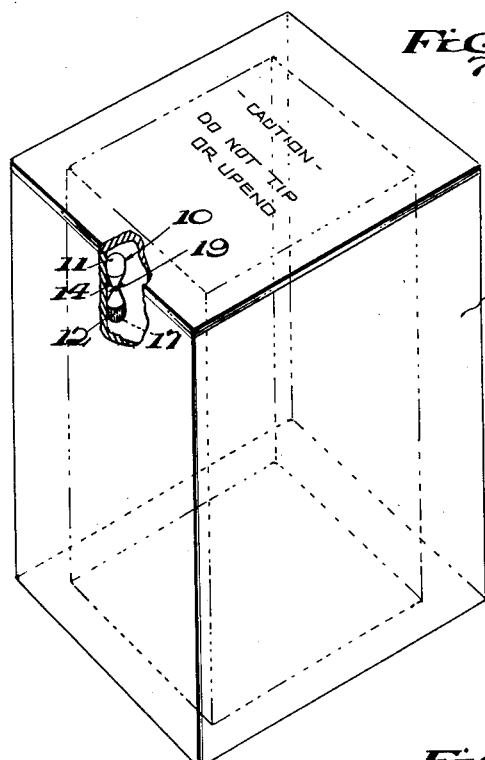
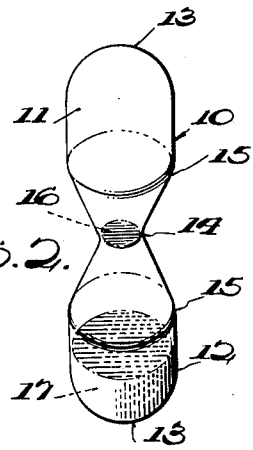
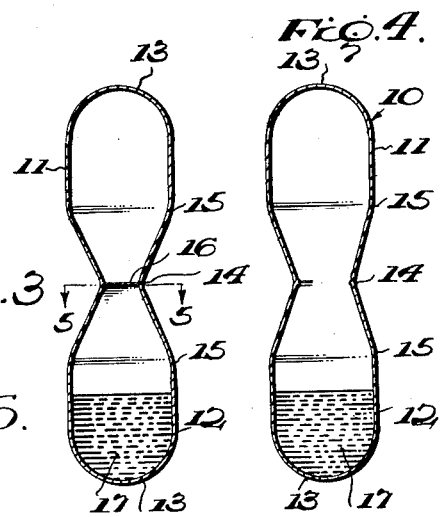
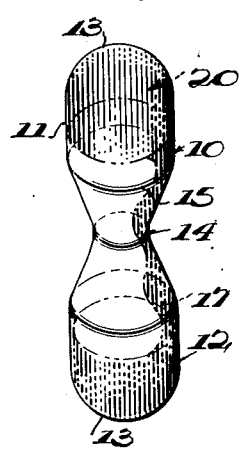
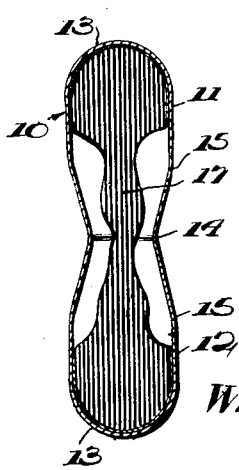
INVENTOR.
William F. Tinsley.
BY
ATTORNEY

Patented Apr. 6, 1954

2,674,221

UNITED STATES PATENT OFFICE 2,674,221

TILT OR INVERSION INDICATOR

William F. Tinsley, Williamsburg, Va.

Application June 24, 1953, Serial No. 363,953

4 Claims. (Cl. 116—114)

(Granted under Title 35. U. S. Code (1952), sec. 266)

The invention described herein, if patented, may be manufactured and used by or for the Government for governmental purposes, without the payment to me of any royalty thereon.

My invention relates broadly to visual indicators, and more particularly to an indicator which reveals whether or not an article to which the indicator is applied has been tilted or inverted.

A primary object of the invention is to provide an indicator of the above mentioned character, which is inexpensive to manufacture in quantity, and disposable after serving its intended purpose.

A further object is to provide an indicator which may be handled or shipped in bulk quantities, without any special packaging arrangement, or special handling, prior to using the same in connection with the article to which the indicator is subsequently applied.

A further object is to provide a visual indicator embodying a somewhat flexible capsule for holding a quantity of liquid dye, and having a frangible part dividing the capsule into separate compartments and preventing the dye from entering one of the compartments, prior to the destruction of the frangible part.

Other objects and advantages of the invention will be apparent during the course of the following description.

In the accompanying drawings, forming a part of this application, and in which like numerals are employed to designate like parts throughout the same, Figure 1 is a perspective view of a visual indicator embodying the invention, and showing the same applied to an article which should not be tilted or inverted, Figure 2 is an enlarged perspective view of the indicator prior to application to the article, Figure 3 is a central vertical longitudinal section through the indicator shown in Figure 2, Figure 4 is a similar section through the indicator after the frangible part of the indicator has been ruptured or destroyed, Figure 5 is a horizontal transverse section taken on line 5—5 of Figure 3, Figure 6 is a further central vertical longitudinal section through the indicator, illustrating the manner in which the liquid dye flows from one compartment of the indicator to the other compartment when the article to which the indicator is applied is tilted or inverted, and, Figure 7 is a perspective view of the indicator, after part of the same has been permanently stained by the liquid dye for revealing that the article to which the indicator is applied has been tilted or inverted.

In the drawings, wherein for the purpose of illustration is shown a preferred embodiment of the invention, the numeral 10 designates generally a capsule of substantially transparent gelatinous material, or the like. The gelatinous capsule 10 is of unitary construction, and comprises end substantially cylindrical portions or sections 11 and 12, having spherically rounded ends 13, integral therewith. The end sections 11 and 12 of the capsule are integrally joined by an intermediate throat section 14 of reduced cross section, the throat section being conically flared from the longitudinal center of the capsule, toward the inner ends of the cylindrical sections 11 and 12, and integrally joined therewith at 15.

A thin frangible or rupturable disk or membrane 16 of the same gelatinous material from which the capsule 10 is formed, is formed integrally with the capsule at the longitudinal center of the reduced throat portion 14, inside of the reduced throat portion, as shown. The disk 16, prior to destruction completely closes the throat portion 14, and divides the capsule 10 into separate end compartments or chambers, defined by the end sections 11 and 12. The disk or membrane 16 is substantially thinner than the wall thickness of the throat portion 14 and end sections 11 and 12, and adapted to be ruptured when the capsule 10 is distorted, in a manner to be described.

A suitable quantity of liquid dye 17 is contained within the end section 12 of the capsule, and prevented from entering the end section 11 by the disk 16, prior to the rupturing of the disk. The liquid dye 17 may be of any desired color, such as red. While I have shown the liquid dye 17 within the end section 12, for the purpose of illustration, it is entirely immaterial whether the liquid dye is placed within the end section 12 or the end section 11, during the manufacturing of the capsule 10. The capsule, including its throat portion 14 is somewhat elastic and deformable, due to the nature of the gelatinous material from which it is formed.

In use, the capsule 10 is held in the upright position shown in Figure 2, with the liquid dye 17 disposed in the lowermost end section of the capsule. The reduced throat portion 14 is pinched with the fingers and deformed for rupturing or breaking the frangible membrane 16. Prior to pinching the throat portion 14, the membrane 16 is circular, as indicated in Figure 5. When the capsule is pinched, the cross sectional shape of the throat portion 14 becomes elliptical, and the membrane 16, which is very thin is stretched or elongated and readily ruptures, and preferably substantially disintegrates. When this occurs, the reduced throat portion 14 may expand slightly, as indicated in Figure 4, due to the absence of the inherent tensioning effect of the membrane 16, and the opening between the end sections 11 and 12 of the capsule becomes somewhat enlarged. The chambers or compartments of the capsule, defined by the end sections 11 and 12 are now in direct communication, and the liquid dye 17 may enter the opposite end section of the capsule, upon tilting or inverting of the same.

After the membrane 16 is ruptured by the above described pinching of the throat portion 14, the capsule 10 is applied to the article upon which it is to serve as a tilt indicator, in any preferred manner, and while still in the upright position, with the liquid dye 17 in the lower compartment of the capsule. For example, as indicated in Figure 1, the capsule 10 may be secured to a wall of a container or carton 18 or the like, by bending a wire 19 about the throat portion 14 of the capsule for supporting the same in the upright position. Various other means, not shown, may be employed for holding the capsule 10 in the upright position upon the article with which it is associated, and the use of the wire 19 merely indicates one preferred means of mounting the capsule. If preferred, the capsule may simply be placed inside of the carton 18, among the goods, or within the packing material, such as excelsior, wadded paper, or the like, in an upright position, and the manner of applying the capsule to the article 18 is entirely a matter of choice.

With the capsule 10 thus applied to the article 18, any subsequent tilting of the article beyond the desired limit, or upending or inversion of the article, will cause the liquid dye 17 in the lower compartment of the capsule to run into the upper compartment of the capsule, in the manner generally indicated in Figure 6. When this occurs, the liquid dye will permanently stain the inner surface of the upper end section of the capsule 10, as indicated at 20 in Figure 7. Since the capsule 10 is substantially transparent, the stain 20 in the upper compartment of the capsule will be visible to subsequently indicate that the article or carton 18 has been tilted beyond the desired limit or inverted. The indicating capsule 10 may of course be applied to either the inside or the outside of the carton 18, as preferred, and in fact, the capsule need not be used in connection with a carton, but it may be applied directly to the article which should not be tilted, such as a delicate scientific instrument or the like.

Since the liquid dye 17 cannot enter the opposite end section of the capsule 10, prior to rupturing of the frangible membrane 16, no special handling or orienting of the capsules 10, during their shipment in bulk quantity is necessary, and the completed capsules may be shipped loose, in the desired quantities, and may be subjected to reasonably rough handling, without damaging the same.

My visual indicator is quite inexpensive to manufacture, and after it has served its intended purpose, it may be discarded. The device is capable of a wide variety of applications to various articles, upon which it is desired to indicate whether the same have been tilted beyond prescribed limits or entirely inverted.

It is to be understood that the form of the invention, herewith shown and described is to be taken as a preferred example of the same, and that various changes in the shape, size and arrangement of parts may be resorted to, without departing from the spirit of the invention, or scope of the subjoined claims.

I claim:

1. A tilt or inversion indicator comprising a hollow capsule of yieldable material, a frangible partition formed within the capsule between opposite ends of the same and dividing the capsule into separate chambers, and a colored liquid indicating medium capable of staining the capsule contained within one chamber and prevented by said partition from entering the other chamber of the capsule while the partition is unbroken, the capsule being at least in part transparent adjacent to said other chamber, whereby breaking of said partition by deforming the capsule allows the colored liquid indicating medium to enter said other compartment and stain the adjacent portion of the capsule when the article to which the capsule is applied is tilted or inverted subsequent to breaking said frangible partition.

2. A device for indicating whether or not an article has been tilted or inverted comprising a hollow body portion of substantially transparent deformable material, a rupturable partition secured within said body portion between opposite ends of the same and dividing the body portion into a pair of separate chambers, and a colored fluid indicating medium contained within one of said chambers and prevented by said rupturable partition from entering the other chamber while the partition is intact, whereby deforming of the hollow body portion to rupture said partition will place said chambers in communication and allow the colored fluid indicating medium to pass into the other chamber and stain the walls thereof when the device is applied to an article which is subsequently tilted or inverted after rupturing of said partition.

3. A tilt indicator comprising a hollow gelatinous body portion which is substantially transparent and somewhat elastic, a frangible membrane formed within an intermediate portion of the hollow body portion and dividing the body portion into separate chambers, and a liquid stain contained within one chamber of the hollow body portion and prevented from entering the other chamber by said membrane, whereby the hollow body portion may be tilted or inverted prior to destruction of the membrane without staining the walls of the chamber upon the opposite side of the membrane, the membrane being rupturable by deforming the intermediate portion of the hollow body portion for placing the chambers in direct communication, whereby subsequent tilting or inverting of the hollow body portion will cause the liquid stain to enter the other chamber and stain the walls of the same.

4. A tilt indicator comprising an elongated gelatinous capsule having an intermediate portion of reduced cross section, a frangible barrier element disposed within the intermediate portion of the capsule and dividing the capsule into separate chambers, the barrier element being destroyed by pinching or deforming the intermediate portion of the capsule with the fingers to thereby place said chambers of the capsule in communication, and a liquid stain medium contained within one chamber of the capsule and prevented from entering the other chamber by said barrier element prior to destruction of the same and adapted to enter and stain the walls of the other chamber when the barrier element is destroyed and the capsule is subsequently tilted or inverted with the article to which it is applied.

References Cited in the file of this patent

UNITED STATES PATENTS

| Number | Name | Date |
| --- | --- | --- |
| 2,378,345 | Wharff | June 12, 1945 |
| 2,572,940 | Lockhart | Oct. 30, 1951 |